Patented Dec. 7, 1937

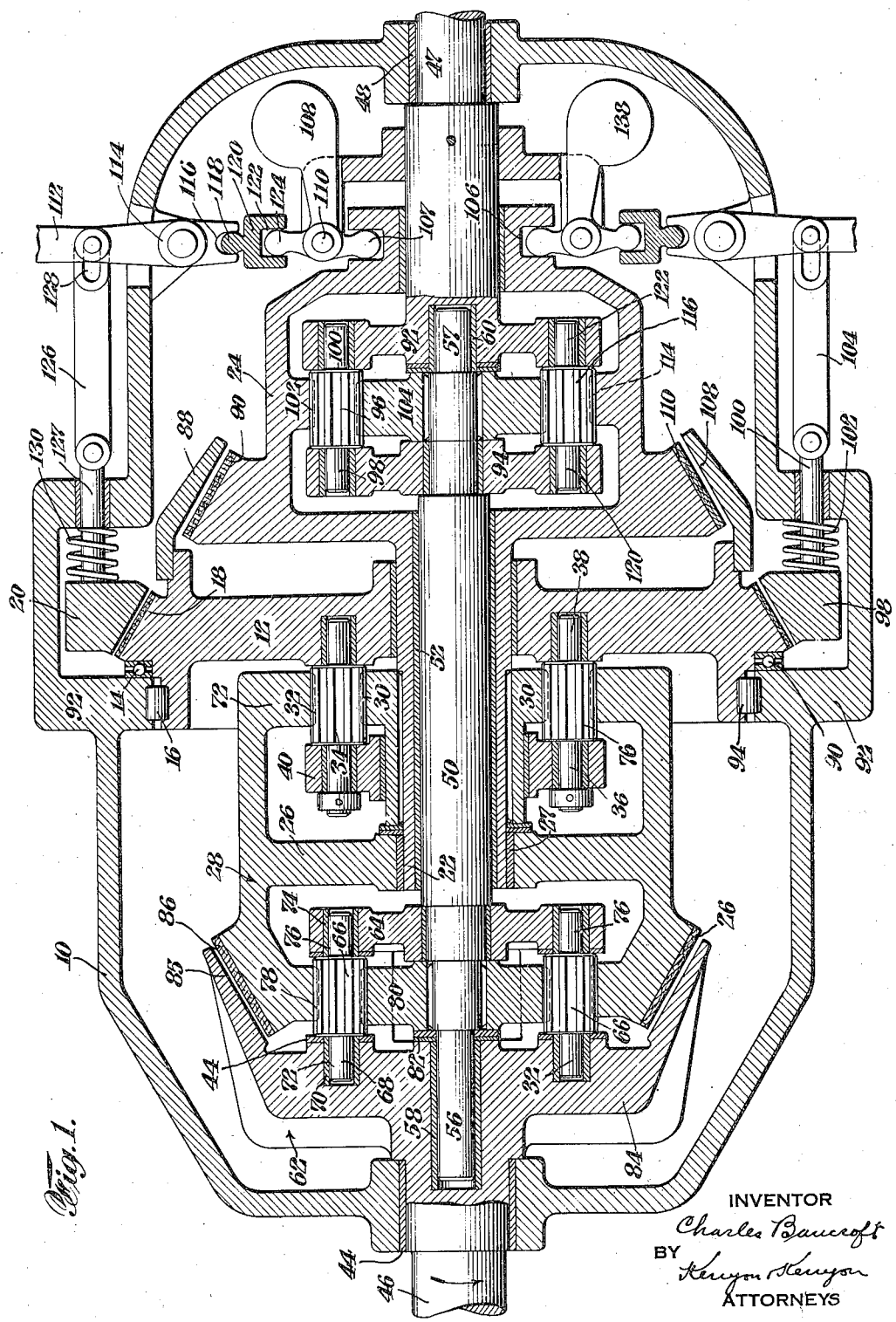

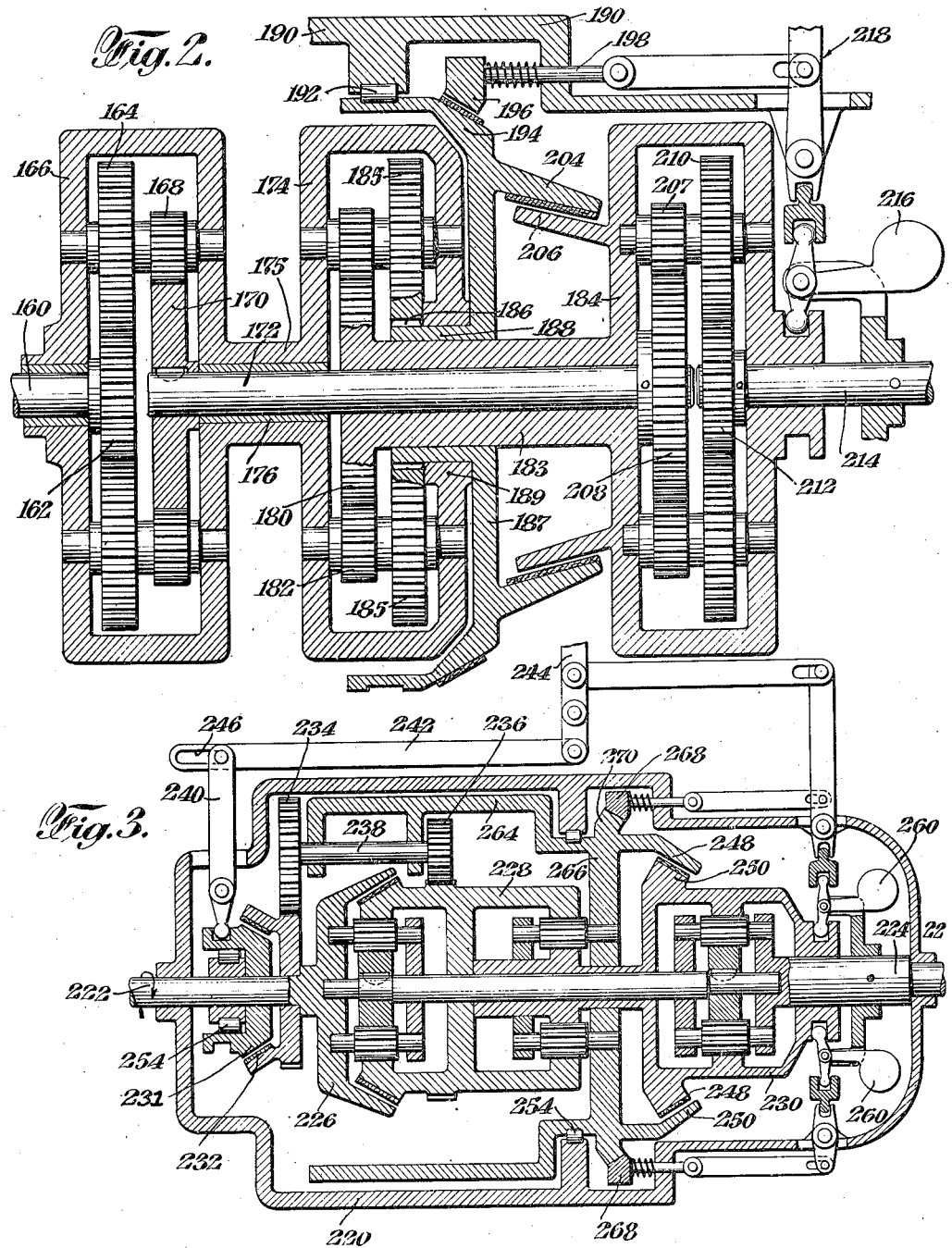

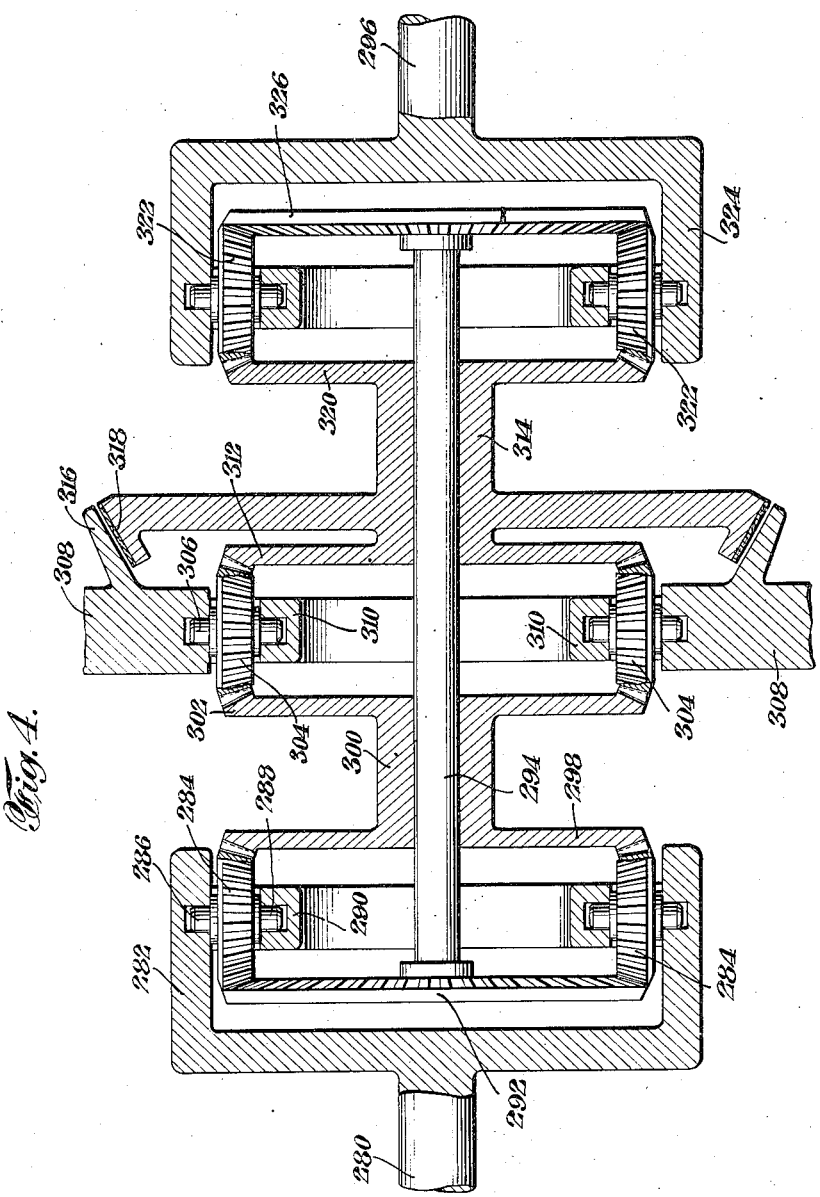

2,101,233

UNITED STATES PATENT OFFICE 2,101,233

VARIABLE TRANSMISSION MEANS

Charles Bancroft, New Canaan, Conn.

Application March 6, 1937, Serial No. 129,329

12 Claims. (Cl. 74—260)

This invention relates to improvements in variable transmissions.

A device made according to my invention automatically provides an infinite number of ratios by coupling an input shaft and an output shaft through gear means. In another form of my invention I use an extra clutch and gears to obtain a more efficient low speed because the clutch operates positively and friction losses are reduced.

In the drawings:—

Figure 1 represents a longitudinal vertical cross-section taken through one form of a device made according to my invention;

Figure 2 represents partial longitudinal vertical cross-section of a modification of the form shown in Fig. 1, in which I have substituted spur gears for the internal gears of Figure 1;

Figure 3 represents a longitudinal vertical cross-section of a further modification of the form shown in Figure 1 in which a clutch is used to control the speed of one of the cages or frames to obtain a more efficient low speed; and Figure 4 represents a longitudinal cross-section of another form of my invention with the casing or housing omitted.

Referring now to the drawings, the reference character 10 designates a housing or stator for receiving my transmission means. The stator may be made of several pieces bolted together. Mounted approximately in the middle of the stator 10 is a fulcrum member 12 capable of rotation within said stator and held in bearings 14 and one way locking device 16. Clutch face 18 mounted on member 12 and clutch face 20 slidably mounted on stator 10 are provided to co-operate with one way locking device 16 in holding member 12 stationary with respect to the stator 10. Since there is only one exceptional condition under which fulcrum member 12 is ever allowed movement with respect to stator 10, which case will be described later, for the purposes of the greater part of this description, member 12 may be considered as an integral part of said stator.

Mounted rotatably in fulcrum member 12 by means of extension 22, which is an integral part of it, is frame 24. Rotatably mounted on extension 22 by means of its integral flange 26 is frame 28. Bearing 27 is provided for flange 26.

Extension 22 of frame 24 is provided with spur gear 30 and frame 28 is provided with internal gear 32 and both these gears engage with planetary gears 34 which latter have their cylindrical ends 36 and 38 rotatably mounted in bearings provided in member 12 and in member 40, a hub extension of member 12. It is to be noted that gears 34 are wider than ring gear 32 to permit longitudinal movement of frame 28 with respect to gears 34 and members 12 and 40 without a resulting disengagement of internal gear 32 from gears 34.

Rotatably mounted in bearing 44 in one end of stator 10 is input shaft 46. Output shaft 47 is rotatably mounted in bearing 48 in the other end of stator. Between input shaft 46 and output shaft 47 and coaxial with them is shaft 50 rotatably mounted in bearing 52 in extension 22 of member 24 and having extensions 56 and 57 rotatably mounted in bearings 58 and 60 provided in input and output shafts 46 and 47.

Secured to input shaft 46 and mounted within the stator is a hub 62 provided with an extension 64. Mounted between hub 62 and its extension 64 is a plurality of planetary gears 66 having their cylindrical ends 68 mounted in bores 70 provided with bearings 72 in hub 62 and in bores 74 provided with bearings 76 in hub extension 64.

Gears 66 mesh with a ring gear 78 fixed in frame 28 and with a sun gear 80 keyed to one end of the intermediate shaft 50. Gear 80 abuts against bearings 82. It is to be noted that gears 66 are wider than ring gear 78 to permit longitudinal movement of frame 28 with respect to gears 66 and hub 62 without a resulting disengagement of ring gear 78 from gears 66.

Hub 62 is provided with an enlarged head 84 and a bevelled annular surface 85 adapted to serve as a clutch surface when a correspondingly shaped member 86 provided on frame 28 is moved against it.

Fulcrum member 12 is provided on one side with a bevelled clutch face 88 and this clutch face is adapted for engagement with a bevelled clutch surface 90 provided on frame 24. These clutch surfaces are brought into engagement when forward speeds are desired. Any other form of clutch such as a hydraulic clutch may be used instead of the clutch shown.

Secured to output shaft 47 and mounted within the stator 10 is a hub 92 provided with an extension 94. Mounted between hub 92 and extension 94 is a plurality of planetary gears 96 having their cylindrical ends 98 and 100 mounted in hub 92 and extension 94.

Gears 96 mesh with a ring gear 102 fixed in frame 24 and with a sun gear 104 to the end of intermediate shaft 50. It is to be noted that gears 96 are wider than ring gear 102 to permit longitudinal movement of frame 24 with respect to gears 96 and hub 92 without a resulting disengagement of ring gear 102 from gears 96.

Frame 24 has an annular groove 106 near one end thereof to receive the ends 107 of centrifugal weights 108 which are pivoted at 110, to a flange which is an integral part of shaft 47 so that, as the speed of shaft 47 increases during the operation of the device, the weights will move outwardly to move frame 24 to the right in Fig. 1, thereby exerting a pressure to force clutch faces 88 and 90 into engagement. Manual means are provided for accomplishing the same result and includes a lever 112 pivoted to the stator at 114 and provided at its lower end with a fork 116 which engages a pin 118 on a collar 120 having an annular groove 122 to receive the upper end 124 of centrifugal weights 108. Movement of the lever to the right in Fig. 1 will cause clutch faces 88 and 90 to engage.

The link 126, pivoted to lever 112 and connected to arm 127, has a slot 128 to permit movement of lever 112 to the left in Fig. 1 without disturbing or moving link 126 to the left. In this way, cage 24 and, consequently, cage 28 is moved to the left in Fig. 1 to cause engagement of clutch faces 85 and 86 in order to obtain reverse rotation of the output shaft.

When clutch faces 88 and 90 are completely engaged and all rotation of frames 24 and 28 with respect to frame 12 is stopped, the device is in high giving a one to one ratio between input shaft 46 and output shaft 47. Under these conditions, there is no longer any leverage exerted on fulcrum member 12 tending to turn it backward and the only force acting on it is the friction in the gears which tends to rotate it forward carrying it and the frames 28 and 24, which are locked to it by clutch faces 88 and 90, around as a unit with the output and input shafts. To allow this to occur clutch face 20 which has been engaged with clutch face 18 through action of springs 130 to prevent in cooperation with one way bearing 16 any motion of member 12, is connected through link 126 to lever 112 and, as this lever is moved to the right through the action of the centrifugal weights 108, the clutch faces are disengaged. One way bearing 16 prevents fulcrum member 12 from ever turning backward under any conditions. However, as a one to one ratio is reached, the only tendency of member 12 is to turn forward and, with clutch faces 18 and 20 released from engagement with each other, it is free to do this and does, rotating forward as a unit with the input and output shafts, stopping all relative motion of the gears and giving a direct couple between input shaft 46 and output shaft 47.

From the foregoing description, it will be seen that frame 24 is coupled to shaft 50 and sun gear 104 through gearing mounted on member 12, frame 28, gearing mounted in hub 62, and sun gear 80 so that, when input shaft 46 is stationary, any movement imparted to frame 24 will also be imparted to gear 104 and consequently to hub 92 and output shaft 47. It will be further seen, that input shaft 46 is coupled to output shaft 47 through planetary gears 66, sun gear 80, shaft 50, sun gear 104, and planetary gears 96 so that, when frames 24 and 28 are stationary, any movement imparted to input shaft 46 and hub 62 will also be imparted to hub 92 and output shaft 47. Thus, we have two independent parts each capable of imparting rotation to output shaft 47 independently of the other and, consequently, the rotation of the output shaft, must equal the sum or the difference of the rotations of these two parts. Thus, if the input shaft is rotating forward at a certain speed and frame 24 is rotating backward at a speed sufficient so that ring gear 102 passes the same number of teeth by planetary gears 96 backward as sun gear 104 passes forward, the difference between the two movements imparted to output shaft 47 will be zero and this shaft will not rotate.

If the speed of input shaft 46 is not changed, but the backward rotation of frame 24 is reduced then ring gear 102 will not pass the same number of teeth backwards by planetary gears 96 as sun gear 104 passes forward and the output shaft 47 will have a forward motion equal to the difference. If backward rotation of frame 24 is increased rather than reduced, output shaft 47 will be given a backward motion. This latter condition occurs when clutch faces 85 and 86 are engaged to give reverse.

The operation of the device shown in Fig. 1 will now be given. With input shaft 46 rotating at a constant speed and in the direction shown in Fig. 1 and with the device in neutral, clutch faces 18 and 20 are pressed together and cooperate with the free wheeling or one way locking device 16 to prevent rotation of annular fulcrum member 12, and hub 62 and cage 28 rotate in the same direction as input shaft 46 but at different speeds, and sun gears 80 and 104 rotate forward in the same direction as input shaft 46 but at different speeds. Frame 24, reacting from the resistance of output shaft 47 to motion, will rotate backwards and through the gearing mounted on fulcrum 12 cooperates with the gearing mounted in hub 62 and input shaft 46 in driving frame 28 forward.

In order to have neutral position, planetary gears 96 must stand still as far as orbital rotation is concerned but each gear 96 does rotate on its own axis. To obtain this condition, ring gear 102 on frame 24 must pass the same number of teeth by planetary gears 96 as sun gear 104 on shaft 50 but with the gears rotating in opposite directions.

When control lever 112 is pushed to the right, clutch faces 88 and 90 are engaged, causing a resistance to the backward motion of frame 24 which results in motion forward of output shaft. As the engagement of clutch faces 88 and 90 becomes increasingly effective, this result being achieved through the action of weights 108 as a result of centrifugal force, the backward rotation of frame 24 decreases and the forward speed of output shaft 47 increases until complete engagement of the clutch faces is effected and output shaft 47 rotates at the same speed as input shaft 46. In this condition, rotation of frame 24 with respect to fulcrum 12 has completely ceased. The complete engagement of clutch faces 88 and 90 also causes complete release of clutch faces 18 and 20, the longitudinal movement of frame 24 necessary to effect such engagement pulling clutch face 20 away from clutch face 18 by means of lever 112 and rod 127. With the attainment of one-to-one drive between input shaft 46 and output shaft 47, all reaction forces tending to turn fulcrum 12 backward cease and as the free wheeling unit 16 permits forward movement of member 12, the member 12 starts to turn forward as a unit with input shaft 46 and output shaft 47 due to normal frictional resistance to rotation of the gears of the device. This results in a direct drive, the whole device rotating as a unit. In this way, it will be seen that an infinite number of gear ratios is automatically obtained.

To obtain reverse with the device in neutral as above described, it is necessary to increase backward speed of frame 24 and have gearing 102 pass a greater number of teeth by planetary gears 96 than sun gear 104 on shaft 50. To obtain this condition lever 112 is moved to the left in Fig. 1 to disengage clutch parts 88 and 90, and to permit engagement between clutch faces 18 and 20 to hold fulcrum member 12 stationary and cause engagement between clutch faces 85 and 86. The springs 130 maintain clutch faces 18 and 20 in engagement. This will cause cage 28 to rotate with hub 62 and gears 66 and 80 as a unit. Sun gear 104 being connected with sun gear 80 through shaft 50 will rotate at the same speed as gear 80 and in the same direction. With fulcrum member 12 held and with cage 28 rotating in one direction, sleeve extension 22 and frame 24 will rotate at increased speed in the opposite direction, the gear 102 passing more teeth than gear 104 to cause reverse planetary motion of gears 96, and consequently, of hub 92 and output shaft 47.

With the above explanation of the operation, it will be seen that the opposing forces are applied at the fulcrum member 12. The moving force of cage 28 is in one direction and the moving force of the frame 24 is in the other direction and the forces are opposed through planetary gears 34 mounted in member 12 and hub extension 26.

In Fig. 2, I have shown a modification of the form of my invention shown in Fig. 1. The device shown in Fig. 1 includes ring gears which are more expensive than spur gears and in the form shown in Fig. 2 I have eliminated ring gears and have included spur gears. However, the device shown in Fig. 2 operates in substantially the same way as the device shown in Fig. 1. Input shaft 160 is secured to sun gear 162 meshing with planetary gears 164 rotatably mounted in frame 166. Coaxial with gears 164 and fixed in their relation to each other are planetary gears 168 which are smaller than gears 164. Gears 168 mesh with sun gear 170 keyed to intermediate shaft 172 which is coaxial with input shaft 160.

Formed integrally with frame 166 is another frame 174, the frames being connected by a sleeve 175 mounted on bearing 176 on shaft 172. Positioned within frame 174 and rotatably mounted on intermediate shaft 172 is a sun gear 180 meshing with planetary gears 182 rotatably mounted in frame 174. Sun gear 180 is integral with sleeve 183 extending from frame 184 later to be described. Coaxial with gears 182 and fixed in relation to them are larger planetary gears 185 meshing with sun gear 186 integral with fulcrum member 187 through hub 188. The frame 174 has a thickened portion 189 which abuts sun gear 186.

Member 187 is mounted in housing or stator 190 and a free wheeling device 192 permits rotation of the member 187 in one direction but not in the opposite direction as in the form shown in Fig. 1. The member 187 corresponds to the fulcrum member 12 in Fig. 1. Clutch member 194 is provided on member 187 and clutch member 196 is provided which is actuated through rod 198 similar to the actuating rod in Fig. 1. The member 187 has a clutch face 204 which coacts with clutch face 206 on frame 184.

Mounted in frame 184 are planetary gears 207 meshing with sun gear 208 keyed to shaft 172. Coaxial with gears 207 and fixed in their relation to them are larger planetary gears 210 meshing with sun gear 212 on output shaft 214. Centrifugal weights 216 are provided and mechanical operating means 218 is provided similar to that shown in Fig. 1.

The operation of the device shown in Fig. 2 is substantially the same as above given for Fig. 1 and will not be repeated. As in the device shown in Fig. 1, movement of either frame 184 or input shaft 160 will be imparted to output shaft 214 and movement of output shaft 214 will be the sum or difference of their combined movements.

In Fig. 3 I have shown another form of my invention which is the same as the device shown in Fig. 1, except that an additional clutch and connecting gears have been included. A stator or housing 220 is provided, having input shaft 222 and output shaft 224. The hub 226, frame 228 and frame 230 are duplicate constructions of hub 62, frame 28 and frame 24 of Fig. 1. The clutch parts 231 and 232 through gearing 234 and 236 on shaft 238 control the rotation of frame 228 and so control the movement of frame 230 to prevent a higher gear ratio than a predetermined maximum in low gear. The clutch is operated by a pivoted arm 240 which is pivotally connected to lever 242 connected to vertical control arm 244 which also controls the movement of frame 230 through a linkage as in the form in Fig. 1. Lever 242 has a slot 246 to permit movement thereof in one direction without movement of clutch parts 231 and 232.

In the form shown in Fig. 3, clutch parts 248 and 250 are not engaged manually to start the operation of the device from neutral as in Fig. 1, but instead the added clutch faces 231 and 232 are engaged. Clutch part 231 is rotatably mounted on input shaft 222 and connected with the shaft through a one-way clutch 254 which permits rotation of clutch part 231 with respect to the shaft in only one direction. If the shaft is standing still, clutch part 231 can only be moved backward. If the input shaft 222 is rotating in the direction of the arrow, part 231 can remain stationary or rotate up to the speed of the shaft but not faster than the speed of the shaft. Clutch part or plate 232, therefore, when engaged, is also prevented from turning forward more than shaft 222. Face 232 is connected through gears 234 and 236 to frame 228 and the ratio of the gears is chosen such that frame 228 must go proportionately slower than plate 232 and, consequently, input shaft 222.

Since frame 228 rotates faster as the ratio between input shaft 222 and output shaft 224 is raised and the frame 228 is prevented from rotating above a maximum fixed speed, this prevents the ratio from increasing above a predetermined level, and therefore, engagement of clutch parts 231 and 232 limits the possible maximum ratio of the device and forces forward rotation of the output shaft 224. However, since this connection between frame 228 and shaft 222 is established through one-way clutch 254 which allows slower motion of frame 228, the speed of the frame can be reduced at will or stopped so as to reduce the ratio or provide a one-to-one coupling of the parts of the device. This latter effect is caused by clutch faces 248 and 250 which are brought into engagement by the action of centrifugal weights 260 as the velocity of output shaft 224 increases, or as soon as rotation is imparted to the output shaft. The rest of the operation of the device is the same as that described in Fig. 1.

In neutral or in reverse clutch faces 231 and 232 are not engaged and the gear mechanism 234, 236 is not employed. The gear mechanism 234, 236 is carried on an extension 264 of fulcrum member 266, and the gears rotate as a unit when direct coupling is effected by release of clutch faces 268, 270 as described in connection with the device shown in Fig. 1.

In Fig. 4 I have shown another modification of my invention in which I have substituted bevelled gears for the gears shown in the other forms of my invention. The stator or housing is omitted from the drawings. Input shaft 280 has a hub 282. Rotatably mounted in hub 282 are planetary bevelled gears 284 which have one stub shaft 286 mounted in hub 282 and another stub shaft 288 mounted in ring 290. Gears 284 mesh with a sun bevelled gear 292 mounted on one end of intermediate shaft 294 which is coaxial with input shaft 280 and output shaft 296. Gears 284 also mesh with bevelled sun gear 298 on frame 300, frame 300 being rotatably mounted on the intermediate shaft 294.

Frame 300 has a bevelled sun gear 302 meshing with bevelled planetary gears 304. Gears 304 have stub shafts 306 rotatably mounted in fulcrum member 308 and ring 310. Meshing with planetary gears 304 is another bevelled sun gear 312 forming part of frame 314 rotatably mounted on intermediate shaft 294. Fulcrum member 308 has a clutch face 316 which is adapted to cooperate with clutch face 318 on frame 314. Frame 314 has a bevelled sun gear 320 which meshes with bevelled planetary gears 322 rotatably mounted in hub 324 connected to output shaft 296. Planetary gears 322 mesh with bevelled sun gear 326 secured to intermediate shaft 294.

Comparing the construction shown in Fig. 4 with that shown in Fig. 1, it will be seen that hub 282 in Fig. 4 corresponds to hub 62 in Fig. 1, frame 300 corresponds to frame 26, fulcrum member 308 corresponds to fulcrum member 12 and frame 314 corresponds to frame 24. From the above comparison it will be apparent that the operation of the construction shown in Fig. 4 will be substantially the same as the operation of the construction shown in Fig. 1 and need not be repeated.

What I claim is:—

1. A device of the character described, including, in combination, a stator, an input shaft and an output shaft rotatably mounted in said stator, an intermediate shaft in said stator and arranged coaxially with said other shafts, a hub secured to said input shaft, planetary gears rotatably mounted in said hub, a sun gear on said intermediate shaft and meshing with said planetary gears, a frame rotatably mounted on said intermediate shaft, gearing on said frame meshing with said planetary gears, a fulcrum member, gears rotatably mounted in said fulcrum member and associated with said frame, another frame associated with said fulcrum member and having a gear therein, a second sun gear on said intermediate shaft, a hub secured to said output shaft, planetary gears rotatably mounted in said hub and meshing with said second sun gear and said gear on last-mentioned frame.

2. A device of the character described, including, in combination, a stator, an input shaft and an output shaft rotatably mounted in said stator, an intermediate shaft in said stator and arranged coaxially with said other shafts, a hub secured to said input shaft, planetary gears rotatably mounted in said hub, a sun gear on said intermediate shaft and meshing with said planetary gears, a frame rotatably mounted on said intermediate shaft, gearing on said frame meshing with said planetary gears, a fulcrum member, gears rotatably mounted in said fulcrum member and associated with said frame, a second frame associated with said fulcrum member and having a gear therein, a second sun gear on said intermediate shaft, a hub secured to said output shaft, planetary gears rotatably mounted in said hub, meshing with said second sun gear and said gear on said second frame, and clutch means between said second frame and fulcrum member for connecting said frame and fulcrum, and means for operating said clutch means.

3. A device of the character described, including, in combination, a stator, an input shaft and an output shaft rotatably mounted in said stator, an intermediate shaft in said stator and arranged coaxially with said input and output shafts, a hub secured to said input shaft, planetary gears rotatably mounted in said hub, a sun gear on said intermediate shaft and meshing with said planetary gears, a frame rotatably mounted on said intermediate shaft, gears in said frame, a second frame having gearing associated with said gears in said frame, a second sun gear on said intermediate shaft, a hub secured to said output shaft, planetary gears in said hub and meshing with gearing in said second frame and with said second sun gear.

4. A device of the character described, including, in combination, a stator, an input shaft and an output shaft rotatably mounted in said stator, an intermediate shaft in said stator and arranged coaxially with said input and output shafts, a hub secured to said input shaft, planetary gears rotatably mounted in said hub, a sun gear on said intermediate shaft and meshing with said planetary gears, a frame rotatably mounted on said intermediate shaft, gears in said frame, a second frame having gearing associated with said gears in said frame, a second sun gear on said intermediate shaft, a hub secured to said output shaft, planetary gears in said hub and meshing with said second sun gear and with gearing in said second frame, and means for controlling the rotation of said first frame during a certain period of operation.

5. A device of the character described, including, in combination, a stator, an input shaft and an output shaft rotatably mounted in said stator, an intermediate shaft in said stator and arranged coaxially with said input and output shafts, a hub secured to said input shaft, planetary gears rotatably mounted in said hub, a sun gear on said intermediate shaft and meshing with said planetary gears, a frame rotatably mounted on said intermediate shaft, gears in said frame, a second frame having gearing associated with said gears in said frame, a second sun gear on said intermediate shaft, a hub secured to said output shaft, gears in said hub and meshing with said second sun gear and with gearing in said second frame, said hub secured to said input shaft and first frame having cooperating clutch faces, and means for causing engagement of said clutch faces for causing reverse rotation of said output shaft.

6. A device of the character described, including, in combination, a stator, an input shaft and an output shaft rotatably mounted in said stator, an intermediate shaft in said stator and arranged coaxially with said input and output shafts, a hub secured to said input shaft, planetary gears rotatably mounted in said hub, a sun gear on said intermediate shaft and meshing with said planetary gears, a frame rotatably mounted on said intermediate shaft, gears in said frame, a second frame having gearing associated with said gears in said first frame, a second sun gear on said intermediate shaft, a hub secured to said output shaft, planetary gears rotatably mounted in said hub and meshing with said second sun gear, and means for controlling the rotation of said second frame for varying the rotation of said output shaft with respect to said input shaft.

7. A device of the character described, including, in combination, a stator, an input shaft and an output shaft rotatably mounted in said stator, an intermediate shaft in said stator and arranged coaxially with said input and output shafts, a hub secured to said input shaft, planetary gears rotatably mounted in said hub, a sun gear on said intermediate shaft and meshing with said planetary gears, a fulcrum member in said stator, planetary gears rotatably mounted in said fulcrum member, gearing between said two sets of planetary gears, a frame having gearing associated with said planetary gears in said fulcrum member, another sun gear on said intermediate shaft, a hub secured to said output shaft, planetary gears mounted in said hub and meshing with said last-mentioned sun gear, said frame having another gearing meshing with said last-mentioned planetary gears.

8. A device of the character described, including, in combination, a stator, an input shaft and an output shaft rotatably mounted in said stator, an intermediate shaft in said stator and arranged coaxially with said input and output shafts, a hub secured to said input shaft, planetary gears rotatably mounted in said hub, a sun gear on said intermediate shaft and meshing with said planetary gears, a fulcrum member in said stator, planetary gears rotatably mounted in said fulcrum member, gearing between said two sets of planetary gears, a frame having gearing associated with said planetary gears in said fulcrum member, another sun gear on said intermediate shaft, a hub secured to said output shaft, planetary gears rotatably mounted in said hub and meshing with said last-mentioned sun gear, said frame having another gearing meshing with said last-mentioned planetary gears, and means for controlling or preventing rotation of said frame so that rotation of said output shaft is varied with respect to said input shaft.

9. A device of the character described, including, in combination, a stator, an input shaft and an output shaft rotatably mounted in said stator, an intermediate shaft in said stator and arranged coaxially with said input and output shafts, a hub secured to said input shaft, planetary gears rotatably mounted in said hub, a sun gear on said intermediate shaft and meshing with said planetary gears, a fulcrum member in said stator, planetary gears rotatably mounted in said fulcrum member, gearing between said two sets of planetary gears, a frame having gearing associated with said planetary gears in said fulcrum member, another sun gear on said intermediate shaft, a hub secured to said output shaft, planetary gears rotatably mounted in said hub and meshing with said last-mentioned sun gear, said frame having another gearing meshing with said last-mentioned planetary gears, and means for releasing said fulcrum member after the speeds of rotation of the input and output shafts are the same.

10. A device of the character described, including, in combination, a stator, an input shaft and output shaft in said stator, a fixed fulcrum member in said stator, frames rotatably mounted with respect to said shafts and said stator in said stator, gear means associated with said fixed fulcrum and said frames for controlling motion of said frames with respect to each other and said fixed fulcrum, gear means associated with said frames and said output shaft for imparting motion of one of said frames to said output shaft, gear means associated with said input shaft and said output shaft for imparting motion of said input shaft to said output shaft, means associated with said frames and said fixed fulcrum member for controlling motion of said frames with respect to said fixed fulcrum member to control motion of output shaft with respect to said input shaft and said stator.

11. A device of the character described, including, in combination, a stator, an input shaft and output shaft in said stator, a fixed fulcrum member in said stator, frames rotatably mounted with respect to said shafts and said stator in said stator, gear means associated with said fixed fulcrum and said frames for controlling motion of said frames with respect to each other and said fixed fulcrum, gear means associated with said frames and said output shaft for imparting motion of one of said frames to said output shaft, gear means associated with said input shaft and said output shaft for imparting motion of said input shaft to said output shaft, means associated with said frames and said input shaft for controlling the rotation of said frames with respect to said input shaft and said fixed fulcrum member to control motion of output shaft with respect to said input shaft and said stator.

12. A device of the character described, including, in combination, a stator, an input shaft and output shaft in said stator, a fulcrum member in said stator, frames rotatably mounted with respect to said shafts and said stator in said stator, gear means associated with said fulcrum and said frames for controlling motion of said frames with respect to each other and said fulcrum, gear means associated with said frames, said fulcrum, and said output shaft for imparting motion of one of said frames to said output shaft, gear means associated with, said input shaft and said output shaft for imparting motion of said input shaft to said output shaft, means associated with said frames and said input shaft for controlling the rotation of said frames with respect to said input shaft and means for preventing or allowing rotation of said fulcrum member in said stator.

CHARLES BANCROFT.